(12) United States Patent
Lopez Garcia et al.

(10) Patent No.: US 12,488,188 B2
(45) Date of Patent: Dec. 2, 2025

(54) AUTOMATED DECISION MODELLING FROM TEXT

(71) Applicant: INTERNATIONAL BUSINESS MACHINES CORPORATION, Armonk, NY (US)

(72) Inventors: Vanessa Lopez Garcia, Dublin (IE); Thanh Lam Hoang, Maynooth (IE); Yufang Hou, Dublin (IE); Denisa Claudia Moga, Collegewood (IE); Gabriele Picco, Dublin (IE); Marco Luca Sbodio, Castaheany (IE); Inge Lise Vejsbjerg, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/655,207

(22) Filed: Mar. 17, 2022

(65) Prior Publication Data

US 2023/0297784 A1 Sep. 21, 2023

(51) Int. Cl.
*G06F 40/35* (2020.01)
*G06F 40/211* (2020.01)
*G06F 40/253* (2020.01)
*G06F 40/295* (2020.01)

(52) U.S. Cl.
CPC ............ *G06F 40/35* (2020.01); *G06F 40/211* (2020.01); *G06F 40/253* (2020.01); *G06F 40/295* (2020.01)

(58) Field of Classification Search
CPC ...... G06F 40/35; G06F 40/211; G06F 40/253; G06F 40/295; G06F 40/186; G06N 3/0455; G06N 5/045; G06Q 10/067; G06Q 10/10; G06Q 30/0201; G06Q 50/18; G06Q 50/22; G06Q 50/26
See application file for complete search history.

(56) References Cited

U.S. PATENT DOCUMENTS

| 10,380,508 B2 | 8/2019 | Prismon |
| 2016/0140588 A1* | 5/2016 | Bracewell ......... G06Q 30/0204 705/7.33 |
| 2019/0347297 A1* | 11/2019 | Galitsky ............... G06F 40/295 |

(Continued)

OTHER PUBLICATIONS

Arco et al. "Natural language techniques supporting decision modelers" Data Mining and Knowledge Discovery (2021) 35:290-320 https://doi.org/10.1007/s10618-020-00718-4 (https://link.springer.com/article/10.1007/s10618-020-00718-4) (Year: 2021).*

(Continued)

*Primary Examiner* — Pierre Louis Desir
*Assistant Examiner* — Keisha Y. Castillo-Torres
(74) *Attorney, Agent, or Firm* — Onyx IP Group

(57) ABSTRACT

The present inventive concept provides for a method for automated decision modelling from text including obtaining a text corpus including a policy. Terms and syntax are identified within the text corpus related to the policy. Sentence similarities and co-references based on the terms and syntax are identified. Discourse and sentence level semantic parsing is performed based on the terms and the sentence similarities and the co-references using machine learning. A decision model template is generated based on the discourse and semantic parsing, and the decision model template is transformed into an automated decision model.

25 Claims, 12 Drawing Sheets

(56) References Cited

U.S. PATENT DOCUMENTS

| | | | |
|---|---|---|---|
| 2020/0126017 A1 | 4/2020 | Damonte | |
| 2021/0216580 A1* | 7/2021 | Liu | G06F 16/355 |
| 2022/0188949 A1* | 6/2022 | Mulligan | G06Q 50/18 |
| 2023/0289377 A1* | 9/2023 | Chopra | G06T 11/206 |

OTHER PUBLICATIONS

Po-Sen, et al. "A study of using syntactic cues in short-text similarity measure." Journal of Internet Technology 20.3 (2019): 839-850. (https://jit.ndhu.edu.tw/article/view/2062/2074). (Year: 2019).*

Quishpi et al. (2021). Extracting Decision Models from Textual Descriptions of Processes. In: Polyvyanyy, A., Wynn, M.T., Van Looy, A., Reichert, M. (eds) Business Process Management. BPM 2021. Lecture Notes in Computer Science( ), vol. 12875. Springer, Cham. (Year: 2021).*

Bhojanapalli, Srinadh, et al. "Leveraging redundancy in attention with reuse transformers." arXiv preprint arXiv:2110.06821 (2021). (Year: 2021).*

Bajwa et al., "SBVR Business Rules Generation from Natural Language Specification", https://www.aaai.org/ocs/index.php/SSS/SSS11/paper/viewPaper/2378, ResearchGate, Conference: AAAI 2011 Spring Symposium Series—AI for Business Agility (AI4BA), Jan. 2011, pp. 1-8.

Bevilacqua et al., "One Spring to Rule Them Both: Symmetric AMR Semantic Parsing and Generation without a Complex Pipeline", https://ojs.aaai.org/index.php/AAAI/article/view/17489, Proceedings of the AAAI Conference on Artificial Intelligence, vol. 35 No. 14: AAAI-21 Technical Tracks 14, May 18, 2021, pp. 1-4.

Blloshmi et al., "Spring is a seq2seq model for Text-to-AMR and AMR-to-Text (AAAI2021)", https://github.com/SapienzaNLP/spring, SapienzaNLP/spring, Feb. 1, 2022, pp. 1-5.

Ceps, "Study on the costs of compliance for the financial sector",https://op.europa.eu/en/publication-detail/-/publication/4b62e682-4e0f-11ea-aece-01aa75ed71a1, Publications Office of the European Union, Feb. 12, 2020, pp. 1-3.

Chittimalli et al., "BuRRiTo: a Framework to Extract, Specify, Verify and Analyze Business Rules", https://ieeexplore.ieee.org/abstract/document/8952315, 2019 34th IEEE/ACM International Conference on Automated Software Engineering (ASE), 2019, pp. 1190-1193.

Disclosed Anonymously, "A Generic Method for Correlating Formatted Lines of Plain Text to Structured Graphical Elements to Enable Visualization Updates", https://ip.com/IPCOM/000215526, Mar. 6, 2012, pp. 1-19.

Disclosed Anonymously, "Method and System for Detecting Emotions in Text", https://ip.com/IPCOM/000240190, Jan. 11, 2015, pp. 1-7.

Disclosed Anonymously, "Method of Visualizing Semantic Deltas in Diagrams using Affinity", https://ip.com/IPCOM/000199645, Sep. 13, 2010, pp. 1-10.

Etikala et al., "Text2Dec: Extracting Decision Dependencies from Natural Language Text for Automated DMN Decision Modelling", https://doi.org/10.1007/978-3-030-66498-5_27, ResearchGate, Springer Nature Switzerland AG 2020, Conference paper Jan. 2021, pp. 1-14.

Fries et al., "Ontology-driven weak supervision for clinical entity classification in electronic health records", Nature Communications, https://www.nature.com/articles/s41467-021-22328-4, Article No. 12:2017, 2021, pp. 1-11.

Garcia et al., "Natural Language Techniques Supporting Decision Modelers", https://www.researchgate.net/publication/345683219, Researchgate, Springer, Data Mining and Knowledge Discovery 35(5), Jan. 2021, pp. 1-21.

Government of Canada, "Fish harvester Benefit and Grant Program", https://www.dfo-mpo.gc.ca/fisheries-peches/initiatives/fhgbp-ppsp/index-eng.html, Feb. 1, 2022, pp. 1-8.

Grace Period Disclosure, Anonymous, "From Policy documents to Interpretable and Executable Decision Models" Envisioning a Human-AI Collaborative System", 2022 Annual conference of the North American Chapter of the Association for Computational Linguistics", , https://2022.naacl.org/, Seattle, Washington, Jan. 17, 2022, 11 pages.

Haj et al., "The Semantic of Business Vocabulary and Business Rules: an Automatic Generation From Textual Statements", IEEE Access, https://ieeexplore.ieee.org, vol. 9, 2021, pp. 56506-56522.

Hou., "Bridging Anaphora Resolution as Question Answering", https://aclanthology.org/2020.acl-main.132/, 2020 Association for Computational Linguistics, Proceedings of the 58th Annual Meeting of the Association for Computational Linguistics, Jul. 5-10, 2020, pp. 1428-1438.

https://oecd-opsi.org/projects/rulesascode, "Cracking the code rulemaking for humans and machines", OPAI,, Projects >Emerging Tech > Rules as Code (RaC), 2020, pp. 1-4.

https://paperswithcode.com/task/multi-label-text-classification, "Multi-Label Text Classification", Methodology, Jan. 31, 2021, pp. 1-22.

https://support.bizzdesign.com/display/knowledge/DMN+modeling, DMN Modeling, Support, BiZZdesign Support, Feb. 1, 2022, pp. 1-2.

IBM, "Government health and human services solutions", https://www.ibm.com/watson-health/government, Jan. 31, 2022, pp. 1-10.

IBM, "Social Program Management AI Program—Rules as Code", https://w3.ibm.com/w3publisher/spm-ai-program/rules-as-code, Jan. 31, 2022, pp. 1-4.

Karadeniz et al., "Linking entities through an ontology using word embeddings and syntactic re-ranking", https://bmcbioinformatics.biomedcentral.com/articles/10.1186/s12859-019-2678-8, BMC Bioinformatics, 2019, pp. 1-12.

Koshorek et al., "Text Segmentation as a Supervised Learning Task", arXiv:1803.09337v1 [cs.CL], Mar. 25, 2018, pp. 1-5.

Lee et al., "End-to-end Neural Coreference Resolution", https://arxiv.org/abs/1707.07045, arXiv:1707.07045v2 [cs.CL], Dec. 15, 2017, pp. 1-10.

Levin, "Modeling in Software Architecture", University of Ottawa Site Technical Report TR, http://www.site.uottawa.ca, Feb. 2009, pp. 1-40.

Mell et al., "The NIST Definition of Cloud Computing", National Institute of Standards and Technology, Special Publication 800-145, Sep. 2011, pp. 1-7.

Onggo et al., "Agent-Based Conceptual Model Representation Using BPMN", Proceedings of the 2011 Winter Simulation Conference, 2011 IEEE, pp. 671-682.

Papay et al., "Constraining Linear-chain CRFs to Regular Languages", https://arxiv.org/pdf/2106.07306v2.pdf, arXiv:2016.07306v2 [cs.CL], Jun. 15, 2021, pp. 1-14.

Philip et al., "Get out of your own way Unleashing productivity", https://www2.deloitte.com/au/en/pages/building-lucky-country/articles/get-out-of-your-own-way.html, Deloitte BTLC#4, 2022, pp. 1-7.

Red Hat, "Chapter1. Decision Model and Notation (DMN)", https://access.redhat.com/documentation/en-us/red_hat_decision_manage . . . , Jan. 28, 2022, pp. 1-35.

Reimers et al., "Sentence-BERT: Sentence Embeddings using Siamese BERT-Networks", https://arxiv.org/abs/1908.10084, arXiv:1908.10084v1 [cs.CL], Aug. 27, 2019, pp. 1-11.

Suchenia, et al., "Towards UML Representation for BPMN DMN Models", Matec Web of Conferences 252, 02007 (2019), CMES'18, https://doi.org/10.1051/matecconf/201925202007, 2019, pp. 1-6.

Wang, et al., "Automated Concatenation of Embeddings for Structured Prediction", https://arxiv.org/pdf/2010.05006v4.pdf, arXiv:2010.05006v4 [cs.CL] Jun. 1, 2021, pp. 1-18.

Wu et al., "Scalable Zero-shot Entity Linking with Dense Entity Retrieval", https://arxiv.org/pdf/1911.03814.pdf, arXiv:1911.03814v3 [cs.CL], Sep. 29, 2020, pp. 1-11.

* cited by examiner

The Fish Harvester Benefit offers income support to self-employed fish harvesters and sharepersons (those who receive a share of landed value, non-wage earning crew).
The benefit covers up to 75% of income losses beyond a 25% threshold for the 2020 tax year when compared to the higher self-employed fishing income reported to the Canada Revenue Agency (CRA) in 2018 or 2019.
{...}
To receive the benefit, eligible fish harvesters and sharepersons must have:
- experienced self-employed fishing income decline greater than 25% in 2020, compared with their best year of 2018 or 2019, as reported to the CRA
- a minimum of $2,500 in reported self-employed fishing income to the CRA in either 2018 or 2019

Individuals applying for the Fish Harvester Benefit using the online application need to ensure that they have the following information available:
- Applicant's Social Insurance Number (SIN),
- Applicant's Full Name,
- The amount of their reported self-employed fishing income for the 2018 and/or 2019 tax years,
- Income Tax Program Account Number (Business Number) if income is reported under a corporation,
- Applicant's Projected estimate of the applicant's self-employed fishing income for the year 2020,
- Applicant's full home address,
- Applicant's Phone number,
- Applicant's Email,
- Applicant's Bank details for payments (including branch transit number, institution number and account number).

*Note: No payments will be issued if the amount due is less than $2 (administrative efficiency reasons).*

FIG. 2B

Text Highlighting ( following NER )

- Eligibility/Entitlement Product
- Applicable Time Period
- Recipients
- Income
- Personal Data
- Comparison The Fish Harvester Benefit offers income support to self-employed fish harvesters and sharepersons (those who receive a share of landed value, non-wage earning crew). The benefit covers up to 75% of income losses beyond a 25% threshold for the 2020 tax year when compared to the higher self-employed fishing income reported to the Canada Revenue Agency (CRA) in 2018 or 2019.

To receive the benefit, eligible fish harvesters and sharepersons must have:

- experienced self-employed fishing income decline greater than 25% in 2020, compared with their best year of 2018 or 2019, as reported to the CRA
- a minimum of $2,500 in reported self-employed fishing income to the CRA in either 2018 or 2019

Individuals applying for the Fish Harvester Benefit using the online application need to ensure that they have the following information available:

- Applicant's Social Insurance Number (SIN),
- Applicant's Full Name.
- The amount of their reported self-employed fishing income for the 2018 and/or 2019 tax years,
- Income Tax Program Account Number (Business Number) if income is reported under a corporation,
- Applicant's Projected estimate of the applicant's self-employed fishing income for the year 2020,
- Applicant's full home address.
- Applicant's Phone number.
- Applicant's Email.
- Applicant's Bank details for payments (including branch transit number, institution number and account number).

Note: No payments will be issued if the amount due is less than $2 (administrative efficiency reasons).

FIG. 2C

The Fish Harvester Benefit offers income support to self-employed fish harvesters and sharepersons (those who receive a share of landed value, non-wage earning crew).

The benefit covers up to 75% of income losses beyond a 25% threshold for the 2020 tax year when compared to the higher self-employed fishing income reported to the Canada Revenue Agency (CRA) in 2018 or 2019. — Sentence 1

(...)

To receive the benefit, eligible fish harvesters and sharepersons must have:
- experienced self-employed fishing income decline greater than 25% in 2020, compared with their best year of 2018 or 2019, as reported to the CRA — Sentence 2
- a minimum of $2,500 in reported self-employed fishing income to the CRA in either 2018 or 2019

FIG. 2D

| | Provide Template |
|---|---|
| Provider | Inferred: Fisheries and Oceans Canada (DFO) |
| Provided Theme | The Fish Harvester Benefit |
| Provided Content | o Up to 75% of income losses beyond a 25% threshold for the 2020 tax year when compared to the higher self-employed fishing income reported to the Canada Revenue Agency (CRA) in 2018 or 2019<br>AND<br>o No payments is issued if the amount is less than $2 |
| Recipient | Self-employed fish harvesters and sharepersons |
| Recipient Conditions | o Individuals who are self-employed fish harvesters and sharepersons    [occupation]<br>AND<br>o Experienced self-employed fishing income reduction greater than 25% in 2020 compared with the best year of 2018 or 2019, as reported to the CRA<br>AND<br>o A minimum of $5,000 in reported self-employed fishing income to the CRA in either 2018 or 2019    [income]<br>AND<br>o Have the following information available:    [information]<br>    o Social Insurance Number (SIN)<br>    AND<br>    o Full name<br>    AND<br>    o The amount of their reported self-employed fishing income for the 2018 and/or 2019 tax years<br>    AND<br>    o Income Tax Program Account Number (Business Number)<br>        □ Condition: if income is reported under a corporation<br>    AND<br>    o Applicant's projected estimate of the applicant's self-employed fishing income for the year 2020<br>    AND<br>    o Applicant's full home address<br>    AND<br>    o Applicant's phone number<br>    AND<br>    o Applicant's Email<br>    AND<br>    o Applicant's bank details for payments including branch transit number, institution number and account number. |

FIG. 2E

AUTOMATED DECISION MODELLING FROM TEXT

STATEMENT REGARDING PRIOR DISCLOSURES BY THE INVENTOR OR JOINT INVENTORS

A document entitled "From Policy Documents to Interpretable and Executable Decision Models: Envisioning a Human-AI Collaborative System" was submitted anonymously to the 2022 Annual Conference of The North American Chapter of the Association for Computational Linguistics on Jan. 17, 2022. The subject matter of this document was created by the inventors of this Application and was disclosed less than one year prior to the priority date of this Application. Accordingly, this document is a Grace Period Disclosure under 35 U.S.C. § 102 (b) (1) (A).

BACKGROUND

Exemplary embodiments of the present inventive concept relate to decision modelling, and more particularly to automated decision modelling from text.

Decision models are used to generate complex decision outputs from a multitude of variable inputs. Decision models may be linked to process models, information models, and enterprise architecture models. Despite the recent popularity of decision models, there are no works to support augmenting or automating the generation of decision models that can extract both decisions and their dependencies (diagram/graph) from text corpora (e.g., policy documents) involving complex decisions. For example, statutes may include complex decisions based on layers of eligibility criteria (e.g., for an individual to obtain health and social benefits), applicability criteria (e.g., regulations for vessel and ship operators based on load, size, dangerous cargoes, etc), and compliance criteria (conforming/nonconforming actions). Policy automation is essential to consistently delivering services at a population-scale. For example, checking citizens' eligibility to social care services—who is eligible for what, how much and when. However, automating business decisions presents a myriad of problems. It is a tedious, expensive, and time-consuming task that requires domain experts. Policy documents are difficult to understand, sometimes ambiguous, and open to interpretation.

SUMMARY

Exemplary embodiments of the present inventive concept relate to a method, a computer program product, and a system for automated decision modelling from text.

According to an exemplary embodiment of the present inventive concept, a method for automated decision modelling from text is provided including obtaining a text corpus including a policy. Terms and syntax are identified within the text corpus related to the policy. Sentence similarities and co-references based on the terms and syntax are identified. Discourse and sentence level semantic parsing is performed based on the terms and the sentence similarities and the co-references using machine learning. A decision model template is generated based on the discourse and semantic parsing, and the decision model template is transformed into an automated decision model. According to an exemplary embodiment of the present inventive concept, a computer program product is provided for automated decision modelling from text. The computer program includes one or more computer-readable storage media and program instructions stored on the one or more computer-readable storage media. The program instructions include a method for automated decision modelling from text. The method includes obtaining a text corpus including a policy. Terms and syntax are identified within the text corpus related to the policy. Sentence similarities and co-references based on the terms and syntax are identified. Discourse and sentence level semantic parsing is performed based on the terms and the sentence similarities and the co-references using machine learning. A decision model template is generated based on the discourse and semantic parsing, and the decision model template is transformed into an automated decision model.

According to an exemplary embodiment of the present inventive concept, a computer system is provided for automated decision modelling from text. The system includes one or more computer processors, one or more computer-readable storage media, and program instructions stored on the one or more of the computer-readable storage media for execution by at least one of the one or more processors. The program instructions include a method for automated decision modelling from text including obtaining a text corpus including a policy. Terms and syntax are identified within the text corpus related to the policy. Sentence similarities and co-references based on the terms and syntax are identified. Discourse and sentence level semantic parsing is performed based on the terms and the sentence similarities and the co-references using machine learning. A decision model template is generated based on the discourse and semantic parsing, and the decision model template is transformed into an automated decision model.

BRIEF DESCRIPTION OF THE DRAWINGS

The following detailed description, given by way of example and not intended to limit the exemplary embodiments solely thereto, will best be appreciated in conjunction with the accompanying drawings, in which:

FIGS. 2B-H illustrate an example implementing the decision modelling from text 200, in accordance with an exemplary embodiment of the present inventive concept.

Figure 1:
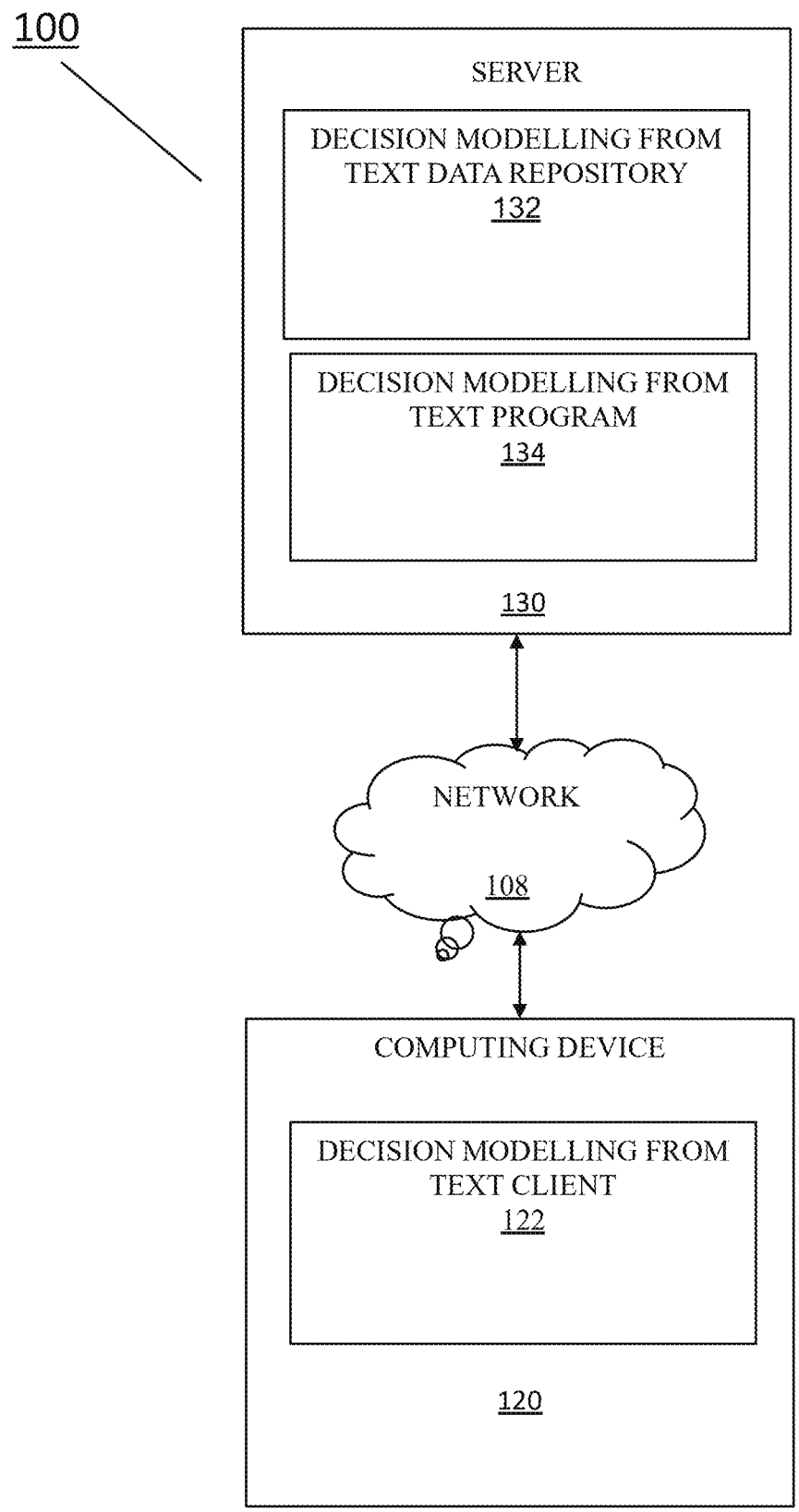
FIG. 1 illustrates a schematic diagram of a decision modelling from text system 100, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. It shall be understood that the following detailed description is focused on the distinctive features or elements of the present inventive concept according to various exemplary embodiments.

As referenced above, the present inventive concept pertains to the automated development of decision modelling from text.

Before coders can implement rules to automate policy intent, business analysts need to first interpret a policy. Interpreting the policy can also involve reference to terms and concepts located in sections of other policies that the analyst needs to access and interpret first; documenting business requirements; and identifying the conceptual model of the data needed for a rule to fail or pass (e.g., what entities and attributes need to be captured to substantiate eligibility decisions). This analysis is typically documented in spreadsheets, and the 'rules' and data are expressed in pseudo-code or simpler Natural Language terms. The rules and data expressed in pseudo-code are then coded by the developers, according to the particular rules engine and legacy system.

While recent open-source standards, such as DMN (Decision Model and Notation) and SBVR (Semantic Business Vocabulary and Business Rules) published by OMG) can be used to represent decision logic and dependencies decoupled from business processes, standards are often not used to document shared understanding.

This long, multi-step translation from policy analysis to coded rules generates the following challenges. Details are lost in translation, gaps, biases, and errors may remain unnoticed in the journey from policy intent to business requirements, to coded rules, and to integration with existing data. It is difficult to ensure the final decision model code accurately reflects the policy, or that artifacts (e.g., excel sheets) are in sync with the code. Gaps in requirements or misinterpretations may remain unnoticed when the code is being written and may be discovered late through testing scenarios, or worse, only after the code is already in production. Decision models are further complicated by the constant revision/supplementation of policy documents in the backdrop of the slow manual creation process. Moreover, it is often difficult to provide a precise explanation of eligibility/applicability/compliance (or lack thereof) to an individual using current decision models. Thus, there is a need for better collaboration tools and the use of standards to document shared understanding; improve transparency, interpretability, and traceability from coded rules to the originated policy text; and enable business analysts to readily validate the implemented rules as true to the policy intent. Although business rules and decision modelling has seen a surge of interest, there are no approaches using artificial intelligence (AI) to support the extraction of fully interpretable and executable decision models from text.

FIG. 1 illustrates a schematic diagram of a decision modelling from text system 100, in accordance with an exemplary embodiment of the present inventive concept.

The decision modelling from text system 100 may include a network 108, a computing device 120, and a decision modelling from text server 130, which may be interconnected via the network 108. Programming and data content may be stored and accessed remotely across one or more servers via the network 108. Alternatively, programming and data may be stored locally on one or more physical computing devices 120.

The network 108 may be a communication channel capable of transferring data between connected devices. The network 108 may be the Internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

The computing device 120 may include a decision modelling from text client 122. The computing device 120 may be connected to an enterprise server, a laptop computer, a camera, a microphone, a scanner, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. Although the computing device 120 is shown as a single device, the computing device 120 may be comprised of a cluster or plurality of computing devices, in a modular manner, etc., working together or working independently.

Figure 3:
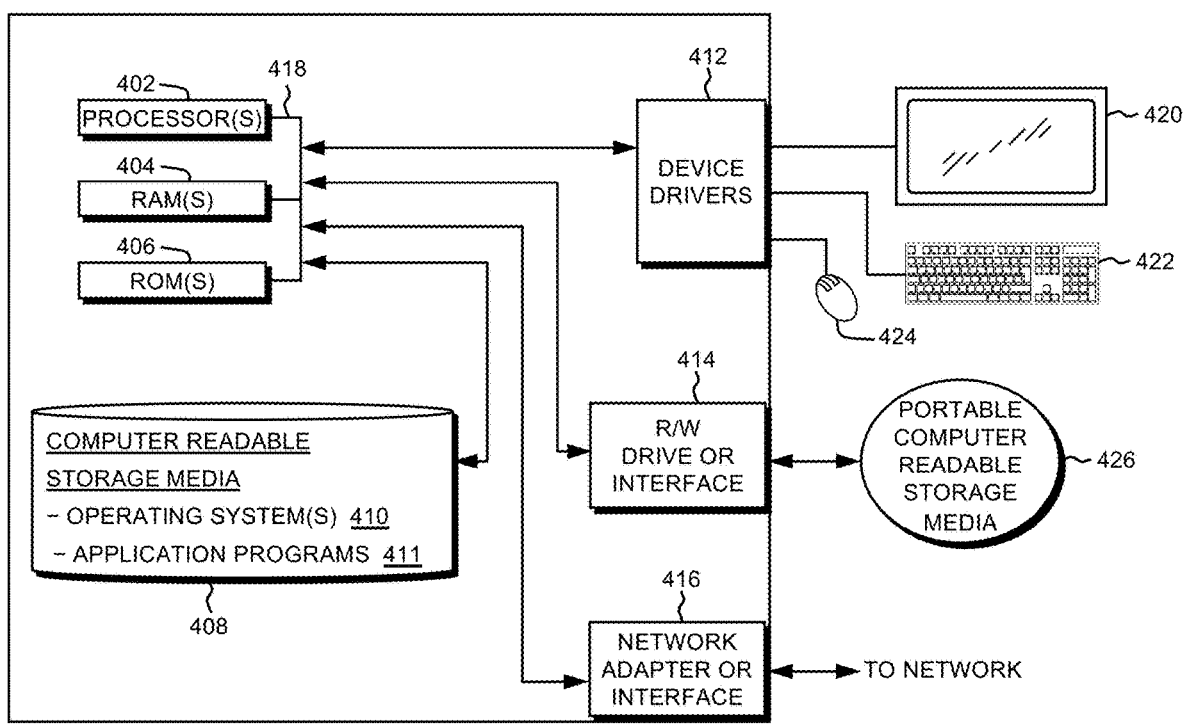
FIG. 3 illustrates a block diagram depicting hardware components used in the decision modelling from text system 100 of FIG. 1, in accordance with an exemplary embodiment of the present inventive concept.
Figure 4:
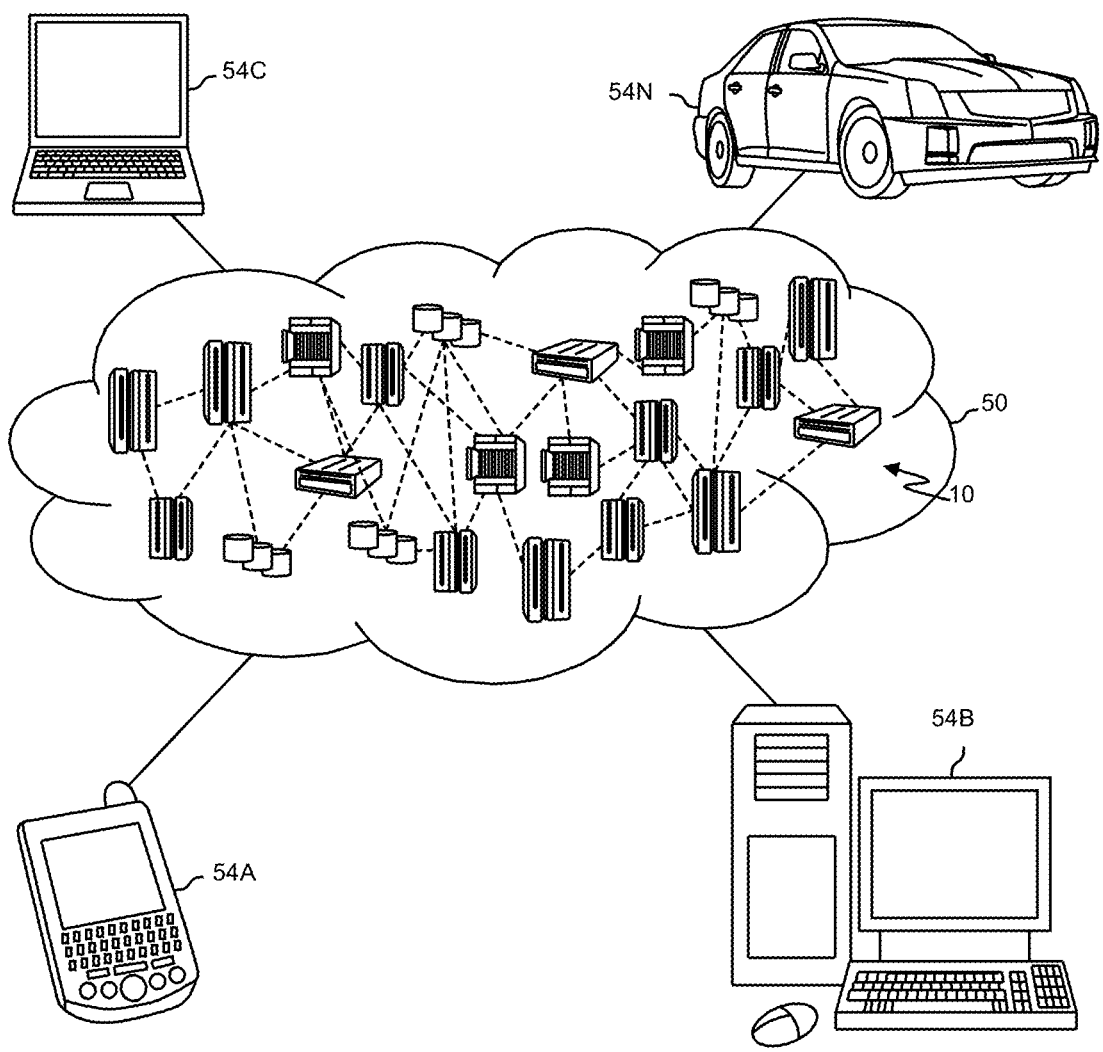
FIG. 4 illustrates a cloud computing environment in accordance with an exemplary embodiment of the present inventive concept.
Figure 5:
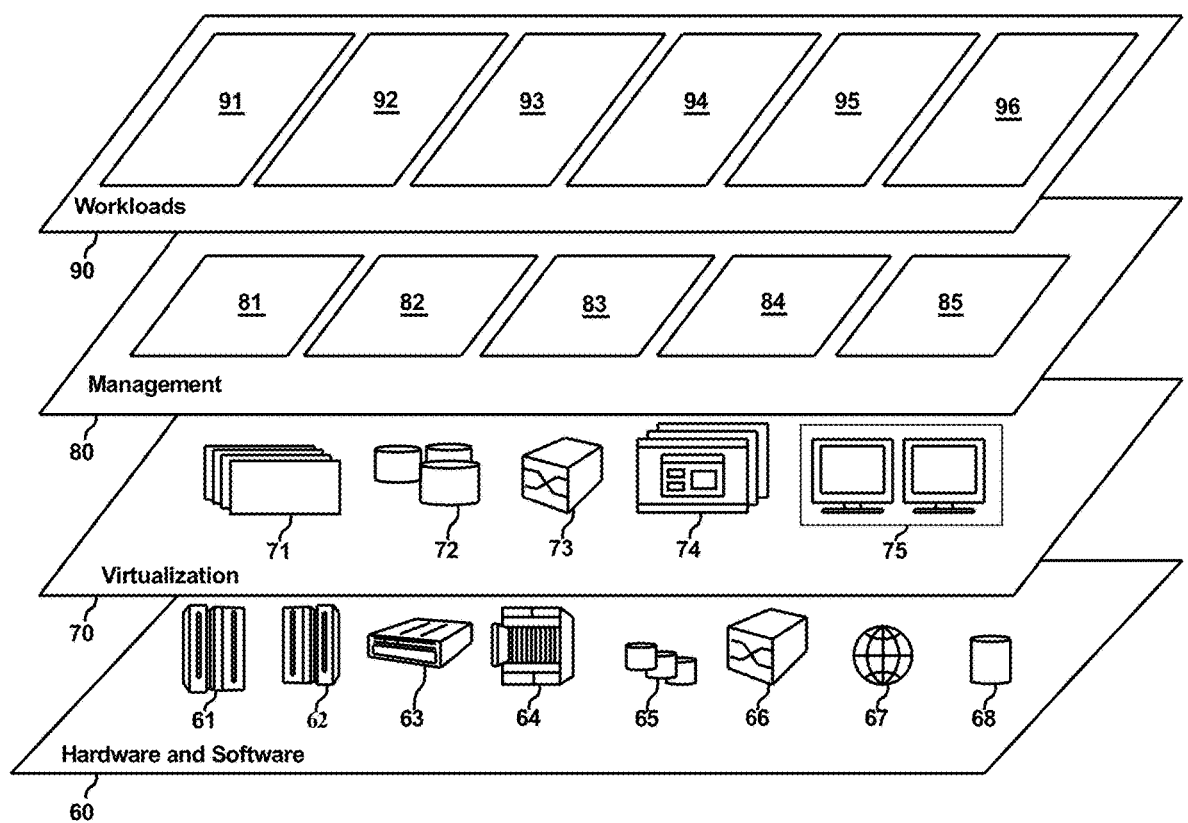
FIG. 5 illustrates abstraction model layers in accordance with an exemplary embodiment of the present inventive concept.

The computing device 120 is described in greater detail as a hardware implementation with reference to FIG. 3, as part of a cloud implementation with reference to FIG. 4, and/or as utilizing functional abstraction layers for processing with reference to FIG. 5.

The decision modelling from text client 122 may act as a client in a client-server relationship with a server (for example, the decision modelling from text server 130). The decision modelling from text client 122 may exchange information (e.g., data) with the decision modelling from text server 130 and/or other computing devices (e.g., computing devices 120) via the network 108. The decision modelling from text client 122 may utilize various wired and wireless connection protocols for data transmission and exchange, including Bluetooth, 2.4 GHz and 5 GHz internet, near-field communication, etc.

The decision modelling from text server 130 may include a decision modelling from text data repository 132 and a decision modelling from text program 134. The decision modelling from text server 130 may act as a server in a client-server relationship with a client (e.g., the decision modelling from text client 122). The decision modelling from text server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices.

Although the decision modelling from text server 130 is shown as a single computing device, the present inventive concept is not limited thereto. For example, the decision modelling from text server 130 may be comprised of a cluster or plurality of computing devices, in a modular manner, etc., working together or working independently.

The decision modelling from text server 130 is described in greater detail as a hardware implementation with reference to FIG. 3, as part of a cloud implementation with reference to FIG. 4, and/or as utilizing functional abstraction layers for processing with reference to FIG. 5.

The decision modelling from text data repository 132 may store decision models, decision model templates, text corpus (e.g., raw text, annotated text, speech, etc.), and reference sources.

The decision modelling from text program 134 may obtain a text corpus; identify terms and syntax within the text corpus; identify sentence similarities and co-references; perform discourse and sentence level semantic parsing; and transform the decision model template into a decision model.

Figure 2A:
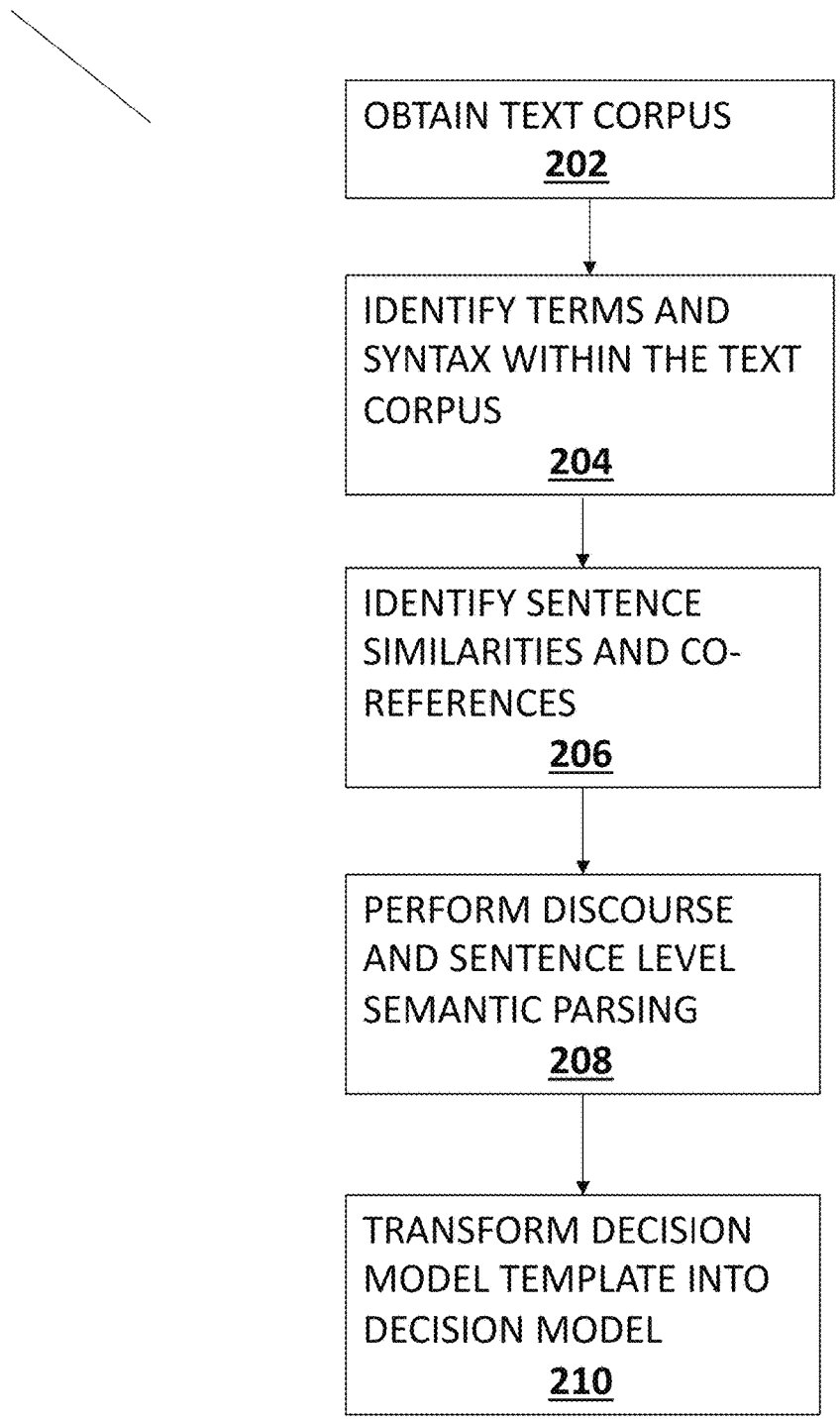
FIG. 2A illustrates a flowchart of decision modelling from text 200, in accordance with an exemplary embodiment of the present inventive concept.

FIG. 2A illustrates a flowchart of decision modelling from text 200, in accordance with an exemplary embodiment of the present inventive concept.

The decision modelling from text program 134 may obtain the text corpus (step 202). The text corpus may include a policy document (e.g., bill text, statutes, business compliance policies, rules, user agreement terms and conditions, etc.). The text corpus may be plural (text corpora), such as co-referencing and/or related policy documents within a broader policy framework (e.g., car safety regulations, occupational safety regulations, import/export tax schemes, etc.). The text corpus may include criteria of determination (e.g., decisions, rules, evidence, etc.) for a policy decision (e.g., applicability of a benefit, penalty, compliance, etc.). The decision modelling from text program 134 may obtain the text corpus from an automated or user-initiated web-crawl (e.g., an internet search for specific policy goals, new policies, policy names/frameworks, specific terms, etc.); a user provided reference source (e.g., a hyperlink); and/or a text corpus manually uploaded by the user (e.g., a scan, typed characters, speech, PDF, etc.). The user may narrow an obtained text corpus' text by selecting specific portions or delineating included/excluded portions with an annotation and/or an identifier (e.g., page, section, paragraph, sentence, header, sub-header, numeric/roman numeral, unique bullet-point type, letter, and/or date, etc.).

In the case of a text corpus obtained by a reference source and/or web-crawl, the decision modelling from text program 134 may download or otherwise copy at least part of the text corpus and store the text corpus within the decision modelling from text data repository 132. The decision modelling from text program 134 may be configured to check/refresh the reference source for updates at periodic intervals of time to determine whether a modified version is available. If a more current version is available, the decision modelling from text program 134 may download, copy, and/or otherwise edit the stored version accordingly. In an embodiment, the decision modelling from text program 134 may obtain the text corpus by processing audio and/or visual multimedia. The decision modelling from text program 134 may transcribe audio multimedia (e.g., speech) discussing a policy into text corpus using AI (e.g., speech-to-text). The text corpus may be obtained from visual multimedia (e.g., scanned images, PDFs, etc.) at least partially including textual components using AI (e.g., using optical character recognition (OCR)).

For example, with reference to FIG. 2B, the decision modelling from text program 134 may obtain a text corpus of a statute by accessing a user-provided hyperlink. As depicted by FIG. 2B, the user delineated the relevant statute section is entitled: Fish Harvester Benefit Program. The decision modelling from text program 134 may download a copy of the Fish Harvester Benefit Program and update it every 4 weeks.

Returning to the flowchart of FIG. 2A, the decision modelling from text program 134 may identify terms and syntax within the text corpus (step 204). The terms (individual words and/or compound words) within the text corpus may be identified using natural language processing (NLP) techniques (e.g., named-entity recognition (NER)). The text corpus may include at least one decision (e.g., an entitlement, user agreement, benefit, penalty, compliance certification, etc.). Broadly, the identified terms may include terms related to criteria for the decision (e.g., evidence, decisions, rules, etc.). In an embodiment, more specific identified terms may include the overall product of a decision (e.g., name of an entitlement, user agreement, benefit, penalty, compliance certification, etc.), applicable time periods (e.g., year/month/days/hour/minute/second, quarters, trimesters, intervals of time, time period type (e.g., tax year, fiscal year, etc.), effected parties (e.g., specific persons, classes of persons, organizations, etc.), reference to measurements (e.g., income, revenue, currency symbols/names, quantities, etc.), words/phrases of comparison (e.g., greater than, less than, minimum, maximum, threshold, best, worst, etc.), and/or personal data (e.g., address, phone number, email, full name, bank details, tax identification number, social security number, etc.). The identified terms may be indicated (e.g., highlighted, underlined, bolded, etc.) and/or annotated by category. Omitted (but implied terms) may be written-in and annotated (e.g., bracketed) as well.

Syntactic relationships between words in a sentence may also be identified (e.g., using a parsing tree). If an ontology appears indicating a policy type and/or topic, the scope of identified terms may be adjusted accordingly to capture the most relevant terms and probable sentence construction. Syntax may be extracted using NLP. In an embodiment, deep semantic parsing, also known as compositional semantic parsing, may be used to create elaborate parse trees of syntax relationships between adjacent words. Thus, the intended rather than literal construction of sentences may be better extrapolated.

In an embodiment, the text corpus can be overlaid with a knowledge graph (KG), also known as a semantic network to identify terms. The KG represents a network of terms—e.g., objects, events, situations, concepts, etc.—and illustrates the relationships between them. The KG may be stored in the decision modelling from text data repository 132 and visualized as a graph structure by the user. In an embodiment, the KG may facilitate identification of terms in a text corpus during a cold-start process by accessing a domain of existent identified terms from non-identical decision models and their characteristics (e.g., evidentiary attributes, related topics, synonyms, syntax, correlation with annotations, role in decision models, decisions, rules, etc.). Even if the existent KG does not include elements from new policies, such as The Fish Harvester Benefit Program, it can still be used to support the NER from policy text—e.g., by matching to existent datatypes, (e.g., participant residency status) and codes (e.g., nationality), etc. For example, the definition of a dependent child changes across policies, but it is likely based on common attributes such as age ranges, and whether a child is financially dependent or has an income.

For example, and with additional reference to FIG. 2C, the decision modelling from text program 134 may apply NLP to The Fish Harvester Benefit Program text corpus. Named-entity recognition and deep parsing may be performed on the text corpus. Named-entities may be identified related to the product of the policy program (Fish Harvester Benefit), the effected parties (self-employed, fish harvesters, and sharepersons), personal data (applicant address, phone number, email address, etc.), applicable time periods (2020 tax year, 2019 tax year, 2018 tax year), income ($2,500 self-reported income, self-employed fishing income, income losses, etc.), and comparative phrases (up to, beyond, threshold, when compared to, best, minimum).

Returning to the flowchart of FIG. 2A, the decision modelling from text program 134 may identify sentence similarities and co-references (step 206). The identification of sentence similarities and co-references may include comparison of individual sentences from one or more text corpora to identify decision and/or rule repetitions and common groupings. Identifying sentence similarities may be used to digest the contents of the text corpus to determine redundant (substantially identical) decision and/or rule sentences, irrelevant sentences to rules and/or decisions, inferred typos, elaboration/qualification of a rule/decision, corroboration of deep-parsed syntax, and general grouping by detecting text fragments describing similar decision information and calculations that can be reused in more than one place. In an embodiment, the decision modelling from text program 134 and/or the user may annotate similar sentences using labels (e.g., boxes and numbers). Annotated correction to inferred typos/illegible/omitted sentences may be determined by applying a classifier model and/or comparing sentences from other text corpora stored in the decision modelling from text data repository 132.

Sentence similarities may be determined based upon predetermined thresholds of matching identified terms, synonyms, semantics, syntax, and/or ontology. Anaphora resolution (AR) may be used to identify synonyms to identified terms and pronouns. In an embodiment, sentence fragments may be given text embedding vectors using pretrained language models (BART, BERT). A bag of noun phrases and verb phrases may be extracted from the fragments of text using an abstract meaning representation (AMR) parser. Similarity between any pair of text fragments may be calculated as the aggregated similarity of the text embedding vectors and the bags of noun-phrases of verb-phares (e.g., using S-Bert and cosine similarity between sentence embeddings to identify similar decisions/rules).

For example, with reference to FIG. 2D, the decision modelling from text program 134 may determine that the illustrated sentences from The Fish Harvester Benefit Program text corpus are redundant phrasings of the same rule for a same decision (minimum income threshold eligibility) based on identified terms, synonyms, and syntax. On the other hand, neither sentence shares sufficient similarities with the sentence: "Individuals fish harvesters or sharepersons applying for the Fish Harvester Benefit using the online application need to ensure that they have the following information available . . . " which represents a distinct decision (online data availability) albeit with some overlapping identified terms related to a same overall decision (Fish Harvester Benefit entitlement).

The decision modelling from text program 134 may perform discourse and sentence level semantic parsing (step 208). Sentence level semantic parsing may be used to identify categories of policy information (e.g., semantic roles, topics, decision points, decision-level type (eligibility v. entitlement amount), rules, rule expressions and conditions, etc.) in the text corpus. Semantic roles may be used to determine to whom (e.g., policy subject), for what (e.g., benefit, penalty, compliance certification, etc.), when (e.g., eligible time periods), how (e.g., identify and group conditions, such as for income, participant eligibility, etc.), etc. The identified categories of sentences may be based on a mutual repeated word or inferred from included words (e.g., using the KG). Inferred categories may include an overarching general category, such as occupation, income, and required information. Cross-sentence and/or text span dependencies, decisions, rules, and/or conditions (e.g., and/or, if/when, exclusions, etc.) may also be identified.

The decision modelling from text program 134 may generate or select a decision model template. In an embodiment, the user may be empowered to alter the decision model template. An existent decision model template may be selected by searching the decision modelling from text data repository 132 for an identified policy, an identified policy type (e.g., a benefit, penalty, compliance certification, etc.), term search, and/or a broad policy topic (e.g., healthcare eligibility, civil fine imposition, standards of vehicle operation compliance, etc.). If an exact identified policy match is found, the decision model template and/or the corresponding decision model may be selected. In an embodiment, the decision modelling from text program 134 may first compare the stored text corpus the decision model template is based on with the presently available text corpus from a reference source to determine whether any substantial textual updates have occurred since the decision model template was produced. The determination of substantial changes may be based upon predetermined parameters for semantic differences, contradictions, and degree of change (e.g., characters, sentences, paragraphs, etc.). If multiple non-specific decision model templates (e.g., policy type, broad policy topic, term search, etc.) are retrieved, the decision modelling from text program 134 may rank the decision model templates based on search term relevance, popularity, matching policy type, broad policy topic, text corpus similarities, etc.

However, non-specific decision model templates may require alteration. Furthermore, during a cold-start process, the decision modelling from text program 134 must generate the decision model template from scratch. In this case, the decision model template fields may be determined based on an identified policy outline (e.g., organized categories and decision logic) in the text corpus. In an embodiment, the parsed sentence semantics may be used in discourse level semantic parsing to organize the sentences into a policy decision outline based on semantic relationships between sentences (e.g., sentences organized by decision logic and inclusion in respective decisions, decision hierarchy, rules, rule hierarchy, topics, semantic roles within rules, etc.). The decision logic (e.g., decisions, rules, evidence, requirements, dependencies/conditions, etc.) may be obtained by analysis of annotations, semantic meanings, similar sentence groupings, conjunctive/disjunctive language (e.g., and, or, neither, both, etc.) within and between sentences/text spans, conditional dependencies (e.g., must, if, when, after, etc.) between sentences/text spans, and implied dependencies of sentences/text spans (e.g., tabbed/bullet-pointed text segments beneath a sentence/paragraph).

In an embodiment, the decision template for the policy may also include sections for policy relevant components, such as the policy implementer, the policy subjects, the decision, rules, and any required action/evidence applicable to the policy subject (e.g., furnishing information on occupation, income, personal information, etc.).

In an embodiment, the decision model template components may be adjusted by the user (e.g., via the decision modelling from text client 122) and used to develop training sets for machine learning. For example, the machine learning may include identified terms, annotations, and/or semantic meanings of sentences (topics of sentence groupings, policy implementer, policy subject, decisions, rules, evidence, etc) from the text corpus. The decision modelling from text program 134 may use a cluster algorithm to group text spans based on embeddings. Using the cluster algorithm, text spans may be grouped within template fields according to identified categories and/or mutual annotations. Text spans may include sentences that are consecutive or non-consecutive, similar or dissimilar groups, from the same or different text corpus, singular or plural, and/or partial or complete. The filled-in decision model template text may be annotated manually by the user or automatically by the decision modelling from text program 134. Relations between text spans relevant to a same decision and/or rule can be determined based on comprising sentence co-references and similarities, conditional dependencies, and/or conjunctive/disjunctive language, and arranged accordingly. Thus, the decision modelling from text program 134 may generate an outline of decision logic for the policy from arranged text spans. In an embodiment, rhetoric structure theory (RST) may be used in parsing sentences and/or text spans (e.g., as annotations).

An illustrative example of a filled-in decision model template for the Fish Harvester Benefit Program is provided with reference to FIG. 2E.

Referring back to the flowchart of FIG. 2A, the decision modelling from text program 134 may transform the filled-in decision model template into a decision model (step 210). The decision modelling from text program 134 may generate the decision model (e.g., decision model and notation (DMN™)) using the outlined policy decision logic (e.g., decisions, decision dependencies, rules, and sources of information) and categories; and filled-in text. The generated decision model may include a decision requirement graph (DRG). A decision requirement diagram (DRD) may be used to provide a graphical view of the DRG to the user. The user may alter the decision requirement diagram. Each decision point may be represented by at least one decision box. Each decision box may include a decision table, a literal expression table, function/business knowledge model (and associated invocations), and/or a context expression table. The decision modelling from text program 134 may select decision box types (e.g., using semantics and/or heuristics). A Boolean expression extractor may include machine learning based models using curated labelled data and/or AMR parsers with provided syntactical dependency rules that can be used to extract those logical expressions from text without a supervision. The logic expressions are then turned into conditions in decision tables. In an embodiment, the decision logic inside the decision table and/or decision boxes may be expressed in the standardised S-FEEL language. S-FEEL Literal expression is a rule-based declarative language that employs comparison operators between attributes and constants as atomic expressions, combined with Boolean operators.

If template text related to a decision indicates discretization of the possible values (e.g., intervals) of the inputs and of the outputs of a decision, a decision table may be used. The decision table is a tabular representation of decision logic. The decision table may include columns representing inputs and outputs for a decision, and each row in the table represents a rule that maps discretized input values onto discrete output values. Each rule consists of one or more conditions and a conclusion. If the text seems to express simple decision logic using a small subset of standard FEEL grammar operators: arithmetic operators, simple positive unary operators, intervals; constant values (e.g., actual numbers, "true"/"false", dates etc.), and built-in FEEL functions, a literal expression table may be used. If the corresponding text seems to express repeatable/reusable logic (e.g., same dependencies between same text spans/semantic themes are expressed in various places in the text corpus, the only difference being given by the values assigned to those concepts), then a function/business knowledge model (and associated invocations) may be used. If the corresponding text expresses more complex decision logic that is a chain of literal expressions/decision tables/function invocations, a context expression box may be used.

In an embodiment, the DMN may generate an explanation of eligibility or ineligibility for a user.

Figure 2F:
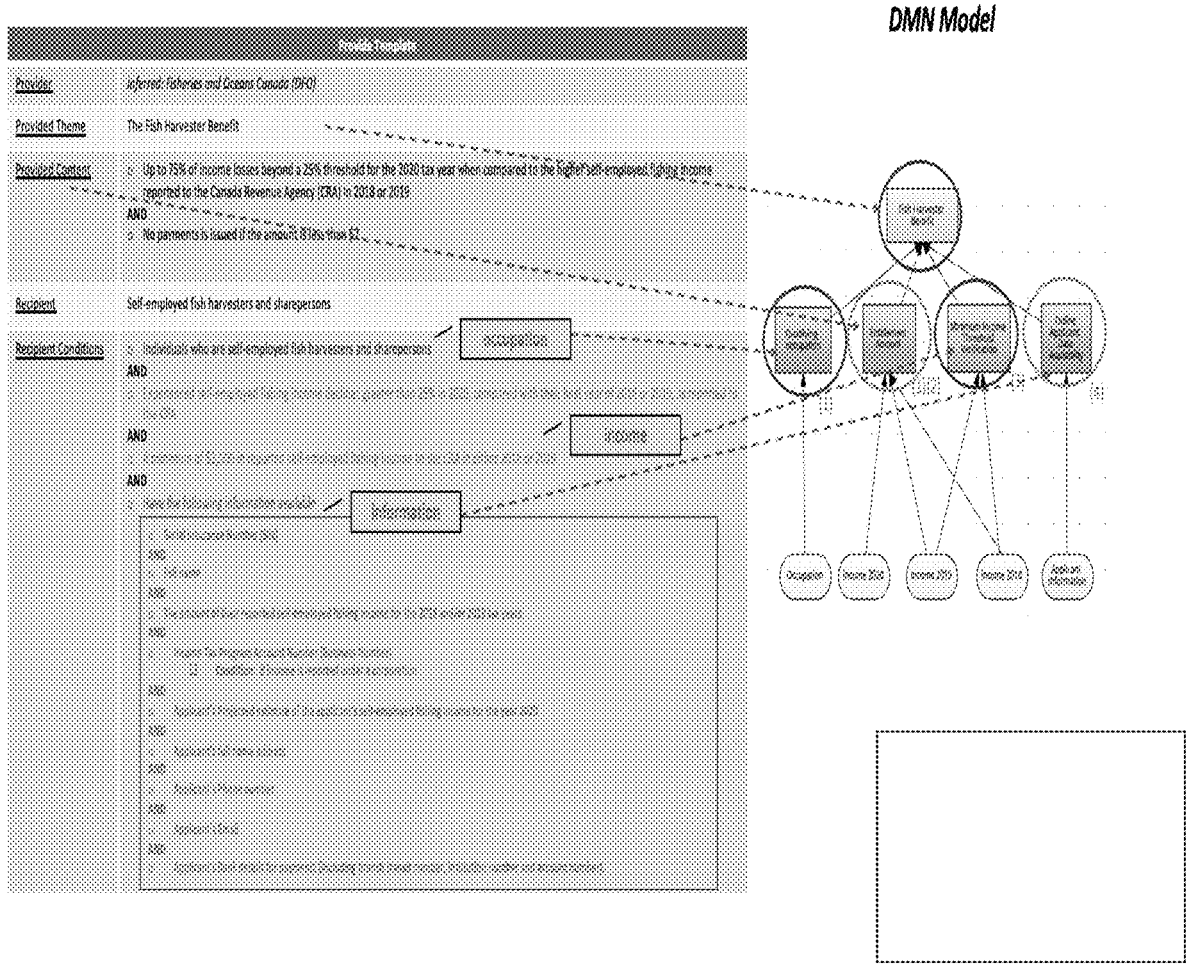
Figure 2G:
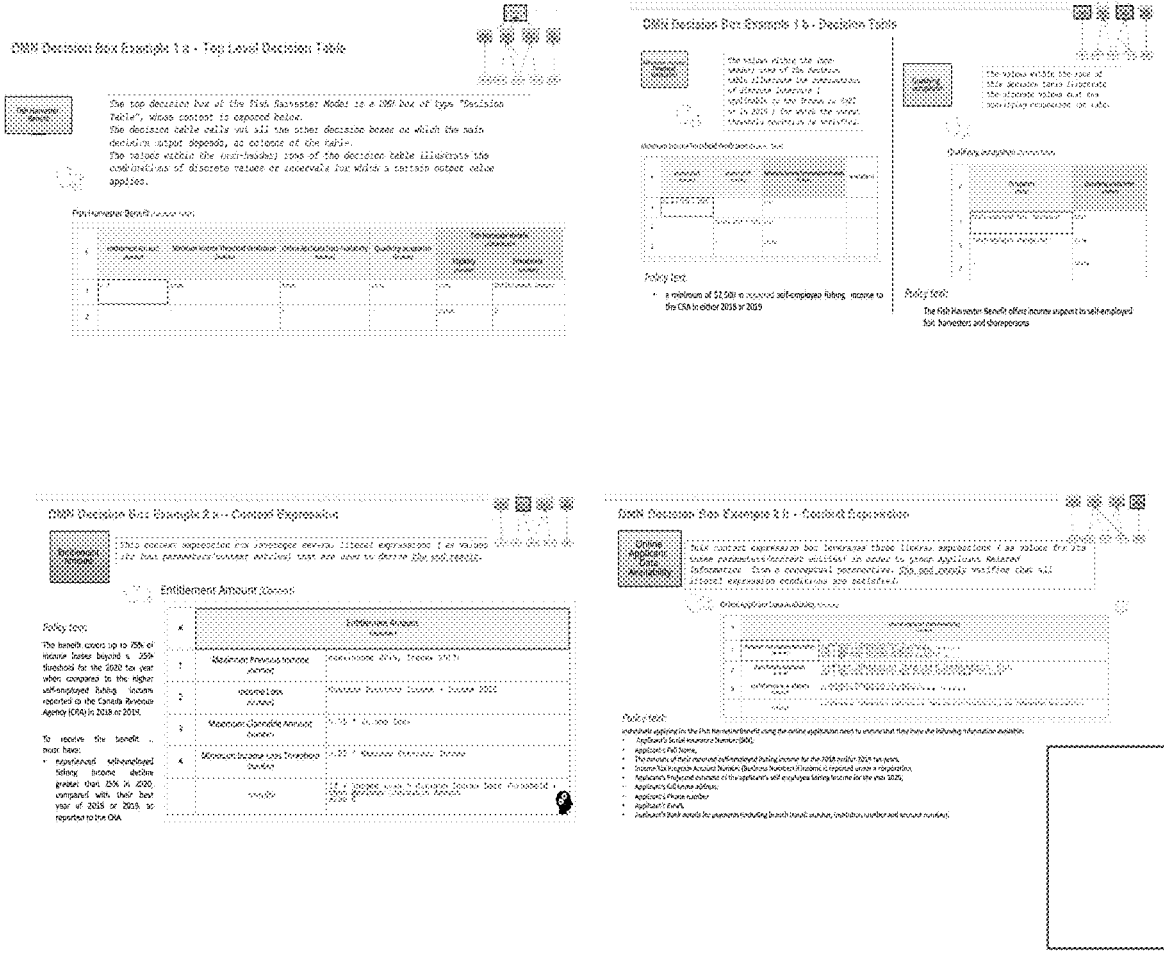
Figure 2H:
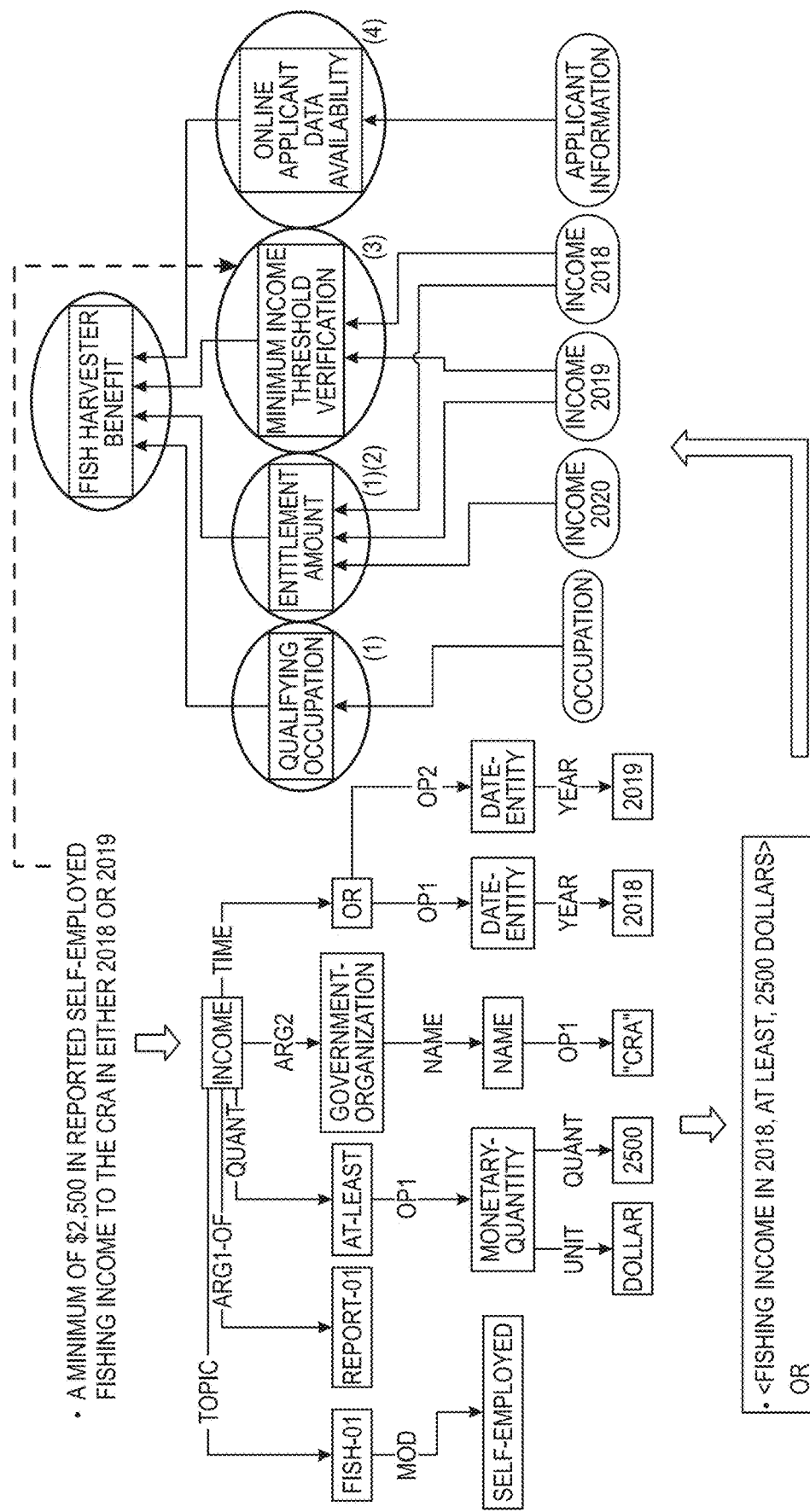

For example, with reference to FIGS. 2F-H, the decision model template for the Fish Harvester Benefit Program may be transformed into a DMN model. The decision logic may be graphically represented as boxes in tiers with directional dependencies between decisions and data input sources. The overall decision box for an applicant's entitlement to the Fish Harvester Benefit includes a decision table. The Fish Harvester Benefit decision table calls out the decision tables for minimum income threshold verification and qualifying occupation, and the context expression tables for entitlement amount and online applicant data availability, each of which has the respective rules and their conditions embodied therein. In this case, to receive the Fish Harvester Benefit, the applicant will have had to satisfy minimum income threshold verification (true), online applicant availability (true), qualifying application (true), eligibility (true), and a qualifying entitlement amount (>$2).

In an embodiment, the decision modelling from text system program 134 may record user changes and user feedback at each stage of the decision modelling from text method 200 and learn accordingly (e.g., by fine-tuning corresponding models saved to the decision modelling from text data repository 132). For example, the decision modelling from text program 134 feedback learning may include recognition of qualitative/quantitative information about the accuracy of computed predictions/suggestions for DMN elements (e.g., categories, decision logic, etc.). The decision modelling from text program 134 may use user alterations to the DMN elements to improve its KG, decision model templates, and decision models for predictions/suggestions.

FIG. 3 illustrates a block diagram depicting components of the decision modelling from text system 100 of FIG. 1, in accordance with an exemplary embodiment of the present inventive concept.

It should be appreciated that FIG. 3 provides only an illustration of one implementation and does not imply any limitations regarding the environments in which different embodiments may be implemented. Many modifications to the depicted environment may be made.

Devices used herein may include one or more processors 402, one or more computer-readable RAMs 404, one or more computer-readable ROMs 306, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 414 to read from and write to one or more portable computer readable storage media 426. Application programs 411 on said devices may be stored on one or more of the portable computer readable storage media 426, read via the respective R/W drive or interface 414 and loaded into the respective computer readable storage media 408.

Devices used herein may also include a network adapter or interface 416, such as a TCP/IP adapter card or wireless communication adapter (such as a 4G wireless communication adapter using OFDMA technology). Application programs 411 on said computing devices may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Devices used herein may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 illustrates a cloud computing environment, in accordance with an exemplary embodiment of the present inventive concept.

As shown, cloud computing environment 50 may include one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated decision model from text processing 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

The invention claimed is:

1. A computer-implemented method for automated decision modelling from text, the method comprising:
obtaining, via a network, a text corpus including a policy;
applying natural language processing (NLP) to the text corpus to extract terms and syntax within the text corpus related to the policy;
determining sentence similarities and co-references, within the text corpus, based on the terms and the syntax, wherein determining the sentence similarities and co-references comprises:
  generating, using a first transformer model, text embedding vectors for sentence fragments of the sentence similarities and co-references, and
  applying a second transformer model to the text embedding vectors and the sentence fragments to determine the sentence similarities and co-references within the text corpus,
    wherein the second transformer model is applied to the text embedding vectors and the sentence fragments to determine redundant sentences of a same rule for a same decision within the text corpus, and
    wherein similarity between a pair of the sentence fragments is calculated, using the second transformer model, as an aggregated similarity of the text embedding vectors and a bag of noun-phrases and verb-phrases extracted from the sentence fragments;
performing discourse and sentence level semantic parsing based on the terms and the sentence similarities and the co-references using machine learning;
generating a decision model template based on the discourse and sentence level semantic parsing; and
transforming the decision model template into an automated decision model.

2. The computer-implemented method of claim 1, wherein the text corpus includes a single document, and wherein the terms include terms that are related to a decision and criteria therefor.

3. The computer-implemented method of claim 1, wherein the NLP includes named-entity recognition (NER) and a parsing tree,
  wherein applying the NLP to the text corpus to extract the terms and syntax comprises:
    applying the NLP to the text corpus to extract named-entities,
      wherein the same decision includes an entitlement, a user agreement, a benefit, a penalty, or a compliance certification.

4. The computer-implemented method of claim 3, wherein identifying the terms includes using a knowledge graph, and
  wherein the knowledge graph represents a network of terms and illustrates relationships between the terms.

5. The computer-implemented method of claim 1, wherein the text corpus includes a decision, and wherein the similar sentences are rules in the decision.

6. The computer-implemented method of claim 5, wherein determining the sentence similarities and co-references comprises determining the sentence similarities and co-references based on predetermined thresholds of matching terms, synonyms, semantics, syntax, and ontology.

7. The computer-implemented method of claim 6, wherein anaphora resolution (AR) is used to identify synonyms to identified terms and pronouns, wherein the sentence fragments of the sentence similarities and co-references are given text embedding vectors using the first transformer model, wherein the bag of noun-phrases and verb-phrases is extracted from the sentence fragments using an abstract meaning representation (AMR) parser, and wherein similarity between a pair of sentence fragments is calculated, using the second transformer model, as the aggregated similarity of the text embedding vectors and the bags of noun-phrases and verb phrases using similarity between sentence embeddings.

8. The computer-implemented method of claim 1, further comprising:
  identifying categories for text spans of the policy related to a decision in the text corpus; and
  generating a decision model template outlining decision logic and identified categories from the text corpus.

9. The computer-implemented method of claim 8, further comprising:
  parsing text spans based upon rhetoric structure theory (RST); and
  using a cluster algorithm to group text spans based on embeddings into the identified categories.

10. The computer-implemented method of claim 9, wherein the decision model includes a decision requirement diagram (DRD) depicting the identified categories and decision logic in the text corpus.

11. The computer-implemented method of claim 10, wherein the DRD includes a hierarchy of decision boxes based upon the categories and decision logic, wherein each decision box includes a decision table with rules expressed in Boolean, wherein the Boolean is extracted from text spans using curated labelled data and AMR parsers with provided syntactical dependency rules for extracting logical expressions, and wherein the rules expressed inside the decision tables are in a standardized standard friendly enough expression language (S-FEEL) language.

12. A computer program product for automated decision modelling from text, the computer program comprising:
  one or more computer-readable storage media and program instructions stored on the one or more computer-readable storage media, the program instructions comprising:
  program instructions to obtain a text corpus including a policy;
  program instructions to apply natural language processing (NLP) to the text corpus to extract terms and syntax within the text corpus related to the policy;
  program instructions to determine, using transformer models, sentence similarities and co-references based on the terms and the syntax,
    wherein the program instructions to determine the sentence similarities and co-references include:
      program instructions to generate, using a first transformer model, text embedding vectors for sentence fragments of the sentence similarities and co-references, and
      program instructions to apply a second transformer model to the text embedding vectors and the sentence fragments to determine the sentence similarities and co-references within the text corpus,
      wherein similarity between a pair of the sentence fragments is calculated, using the second transformer model, as an aggregated similarity of the text embedding vectors and a bag of noun-phrases and verb-phrases extracted from the sentence fragments;
  program instructions to perform discourse and sentence level semantic parsing based on the terms and the sentence similarities and the co-references using machine learning;
  program instructions to generate a decision model template based on the discourse and sentence level semantic parsing; and
  program instructions to transform the decision model template into an automated decision model.

13. The computer program product of claim 12, wherein the terms include terms that are related to a decision and criteria therefor.

14. The computer program product of claim 13, wherein the NLP includes named-entity recognition (NER) and a parsing tree.

15. The computer program product of claim 14, wherein the program instructions to identify the terms comprise program instructions to use a knowledge graph.

16. The computer program product of claim 12, wherein the text corpus includes a decision, and wherein the similar sentences are rules in the decision.

17. The computer program product of claim 16, wherein the program instructions to identify the sentence similarities and co-references include program instructions to identify the sentence similarities and co-references based on predetermined thresholds of matching terms, synonyms, semantics, syntax, and ontology.

18. The computer program product of claim 17, wherein anaphora resolution (AR) is used to identify synonyms to identified terms and pronouns, wherein the sentence fragments of the sentence similarities and co-references are given text embedding vectors using pretrained language models, wherein the pretrained language models include bidirectional encoder representations from transformers (BERT) model, wherein the bag of noun-phrases and verb-phrases is extracted from the sentence fragments using an abstract meaning representation (AMR) parser, and wherein similarity between a pair of sentence fragments is calculated as an aggregated similarity of the text embedding vectors and the bags of noun-phrases and verb-phrases using similarity between sentence embeddings.

19. The computer program product of claim 12, the program instructions further comprising:
 program instructions to identify categories for text spans of the policy related to a decision in the text corpus; and
 program instructions to generate a decision model template outlining decision logic and identified categories from the text corpus.

20. A computer system for automated decision modelling from text, the computer system comprising:
 one or more computer processors, one or more computer-readable storage media, and program instructions stored on the one or more of the computer-readable storage media for execution by at least one of the one or more processors, the program instructions comprising:
 program instructions to obtain a text corpus including a policy;
 program instructions to apply natural language processing (NLP) to the text corpus to extract terms and syntax within the text corpus related to the policy;
 program instructions to determine, using transformer models, sentence similarities and co-references based on the terms and the syntax,
  wherein the program instructions to determine the sentence similarities and co-references include:
  program instructions to generate, using a first transformer model, text embedding vectors for sentence fragments of the sentence similarities and co-references, and
  program instructions to apply a second transformer model to the text embedding vectors and the sentence fragments to determine the sentence similarities and co-references within the text corpus,
  wherein similarity between a pair of the sentence fragments is calculated, using the second transformer model, as an aggregated similarity of the text embedding vectors and a bag of noun-phrases of verb-phrases extracted from the sentence fragments;
 program instructions to perform discourse and sentence level semantic parsing based on the terms and the sentence similarities and the co-references using machine learning;
 program instructions to generate a decision model template based on the discourse and sentence level semantic parsing; and
 program instructions to transform the decision model template into an automated decision model.

21. The computer system of claim 20, wherein the terms include terms that are related to a decision and criteria therefor.

22. The computer system of claim 20, wherein the NLP includes named-entity recognition (NER) and a parsing tree.

23. The computer system of claim 20, wherein the program instructions to apply NLP to the text corpus to extract the terms include program instructions to use a knowledge graph to identify the terms.

24. The computer system of claim 20, wherein the text corpus includes a decision, wherein the decision includes an entitlement, a user agreement, a benefit, a penalty, or a compliance certification, and wherein the similar sentences are rules in the decision.

25. The computer system of claim 24, wherein the sentence similarities and co-references are determined based on predetermined thresholds of matching terms, synonyms, semantics, syntax, and ontology.

\* \* \* \* \*